Patented June 19, 1934

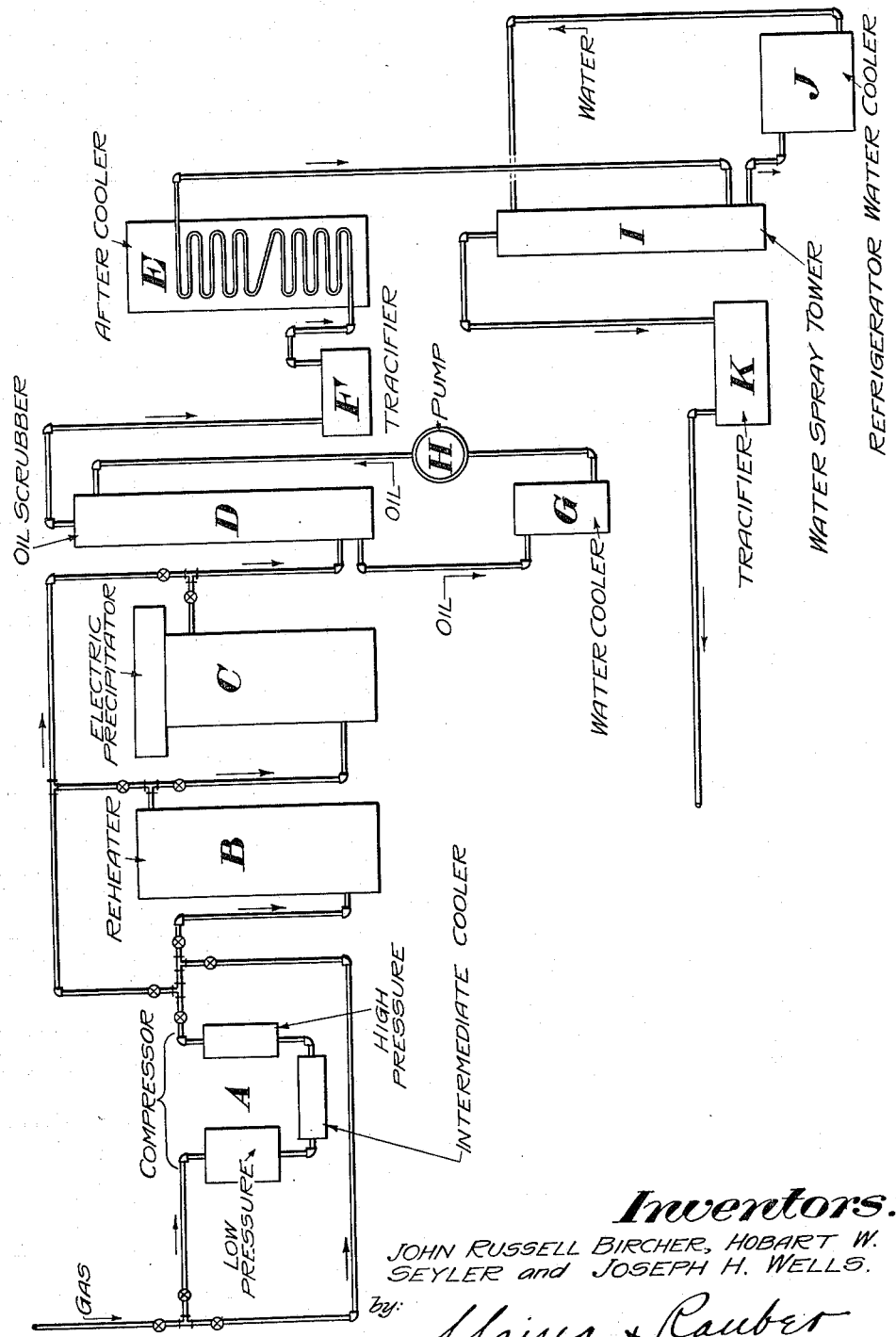

1,963,323

UNITED STATES PATENT OFFICE 1,963,323

TREATMENT OF MANUFACTURED GAS

John Russell Bircher, Clairton, Hobart W. Seyler, Elizabeth, and Joseph H. Wells, Clairton, Pa.

Application April 9, 1932, Serial No. 604,308

1 Claim. (Cl. 204—31)

This invention relates to the removal of resin or gum-forming constituents of manufactured gas.

The resin or resin-forming constituents present in manufactured gas are detrimental in that when the gas is stored or conveyed for any distance in pipe lines the resin present, in addition to that formed by the slow polymerization of the resin-forming constituents, while in storage and/or in transit, is deposited on the valve seats, disks and regulating devices at the point of consumption and causes sticking and generally bad regulation of valves, etc., or when the gas is stored in gas well sands the porous sand is filled with the resin, which results in stopping the flow of gas through the sandstone.

In the drawing, a suitable arrangement of apparatus is shown diagrammatically for carrying out this invention.

In the practice of this invention the gas containing the resin or gum-forming constituents is treated by passing the gas into a compressor A to polymerize the resin and gum-forming constituents, then compressing the gas to from one to fifteen atmospheres at a temperature of from 60 to 250 degrees centigrade, or the gas may be compressed in the compressor A and may then be passed to a reheater B to be reheated to 60 to 250 degrees centigrade, the temperature and pressure depending upon the percentage of the resin and gum-forming constituents present in the gas.

The compressed and heated gas is then subjected to the action of a silent electric discharge similar to that produced in a standard electric precipitator designated by the letter C.

We prefer to compress the gas to eight and one-half atmospheres and heat the compressed gas to 150 degrees centigrade either by the natural heat of compression in the compressor A or, when necessary, by heat applied externally or as in reheater B.

The resin formed by the polymerization of the resin and gum-forming constituents during the above compressing, reheating and electric treatment, in addition to the resin already present in the gas, is removed by scrubbing or washing the gas in a scrubber D or other similar contacting apparatus with an absorbing oil such as petroleum wash oil, coal tar distillates, or the like, the gas entering the scrubber or washer D at elevated pressures and temperatures, that is, between one and fifteen atmospheres pressure and at a temperature of 30 to 250 degrees centigrade. The temperature of the absorbing oil may be between 25 and 250 degrees centigrade. However, we prefer to keep the oil in the scrubber or washer D between 30 and 60 degrees centigrade, at which temperature the resins are effectively removed without an appreciable loss of oil. The temperature of the oil is maintained by continuous circulation through cooling coils G by means of a pump H.

If it is desirable to remove any entrained oil or a part of the oil in solution in the gas, the gas which has been freed from resin and gum-forming constituents is passed through a tracifier F to remove any entrained oil from the scrubber D through the cooling coils E or a water spray tower I or, as is preferable, a combination of both in the customary manner to remove the oil from the gas. To condense and remove from the gas as much oil as possible the water used in spray tower I is recirculated through refrigerated cooler J.

A tracifier K is placed in the gas line on the outlet side of the spray tower to remove any entrained water carried by the gas from the spray tower I.

It will be understood that the polymerization of the resin or gum-forming constituents may be carried out by compressing the gas in the compressor A at an elevated temperature alone or by using either the compressing or heating steps.

While we have shown certain specific embodiments of apparatus for carrying out our invention and have described a certain specific sequence of steps of our method, we do not wish to be limited thereto since various modifications in apparatus and in the sequence of steps of the method may be used and practiced without departing from the scope of our invention, as defined in the appended claim.

We claim:

A process of polymerizing and removing the resin and gum forming constituents present in gas obtained by the carbonization of coal which consists in compressing the gas to more than five atmospheres pressure, heating the compressed gas to an elevated temperature of approximately 150 degrees centigrade and not more than 250 degrees centigrade, and subjecting said compressed and heated gas to the action of a silent electrical discharge to polymerize the constituents to be removed, and then washing the thus treated gas at said pressure and temperature with an absorbing oil to remove the resin content from said gas.

JOHN RUSSELL BIRCHER.
HOBART W. SEYLER.
JOSEPH H. WELLS.